US006738801B1

(12) United States Patent
Kawaguchi et al.

(10) Patent No.: US 6,738,801 B1
(45) Date of Patent: May 18, 2004

(54) MASTER SERVER FACILITATING COMMUNICATION BETWEEN SLAVE SERVERS IN INCOMPATIBLE DATA FORMATS, AND METHOD FOR UPGRADING SLAVE SERVERS

(75) Inventors: Yasunari Kawaguchi, Mishima (JP); Nobuichi Suzuki, Mishima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/475,772

(22) Filed: Dec. 30, 1999

(30) Foreign Application Priority Data

Jan. 8, 1999 (JP) .......................................... 11-003154

(51) Int. Cl.$^7$ ............................................... G06F 9/06
(52) U.S. Cl. ...................................... 709/208; 709/223
(58) Field of Search ................................. 709/219, 246, 709/249, 208, 209, 223

(56) References Cited

U.S. PATENT DOCUMENTS

| | | | | |
|---|---|---|---|---|
| 5,555,418 A | * | 9/1996 | Nilsson et al. .............. | 717/153 |
| 5,805,824 A | * | 9/1998 | Kappe ........................ | 709/242 |
| 5,870,301 A | * | 2/1999 | Yakushiji et al. ............... | 700/3 |
| 5,909,437 A | * | 6/1999 | Rhodes et al. ............... | 370/349 |
| 5,995,980 A | * | 11/1999 | Olson et al. ................. | 707/201 |
| 6,185,197 B1 | * | 2/2001 | Cheung Yeung et al. ... | 370/328 |

* cited by examiner

Primary Examiner—Rupal Dharia
Assistant Examiner—April L Baugh
(74) Attorney, Agent, or Firm—Greer, Burns & Crain, Ltd.

(57) ABSTRACT

A method and apparatus for facilitating communications in a hierarchical network between slave servers communicating in a first data format and slave servers communicating in a second data format. A second version of network software which coexists with an existing first version of network software is installed in a master server. The first version of the network software processes data in a first format and the second version of the network software processes data in a second format different from the first format. The master server is provided with a first converting means for converting the first format data to the second format data when a first predetermined event is detected, and a second converting means for converting the second format data to the first format data when a second predetermined event is detected. The master server facilitates the communication and coexistence of slave servers running the first version of the network software with slave servers running the second version of the network software.

7 Claims, 8 Drawing Sheets

SYSTEM STRUCTURE OF THE PRESENT INVENTION

EXAMPLE OF SERVER SHIFTING

MASTER SERVER FACILITATING COMMUNICATION BETWEEN SLAVE SERVERS IN INCOMPATIBLE DATA FORMATS, AND METHOD FOR UPGRADING SLAVE SERVERS

FIELD OF THE INVENTION

The present invention relates to a method and apparatus for maintaining communication between slave servers communicating in incompatible formats during a network software upgrade process. The present invention provides a way to install new network communications software on one or more slave servers which is incompatible with existing network software, while maintaining communications among the servers running the incompatible software. In particular, the system of the present invention enables servers operating under the old network software to coexist in the same network with servers running the new network software.

BACKGROUND ON THE INVENTION

A common problem encountered by network personnel relates to the upgrading of server network software from a first program to a second program where the two programs communicate in incompatible formats.

There are several different approaches conventionally used to upgrade the network software. According to one approach, new network software is installed on a so-called master server, and then the updated software is sequentially copied from the master server to each of plural slave servers. This approach to upgrading the network software is disruptive to the network, however, as servers running the different versions of the network software are unable to communicate with one another.

Another conventional approach involves simultaneously installing the network software on all of the various servers which together constitute the network.

This approach is problematic in that the entire network is made inoperable while the software is being installed. Moreover, this approach requires a significant number of trained software installers. Notably, the simultaneous installation requires a software installer for each server, which makes this approach impractical in all but the smallest networks.

One object of the invention is to provide an improved master server capable of communicating with slave servers in each of first and second data formats, thereby facilitating communications between slave servers communicating in formats which are incompatible with one another.

A related object of the present invention to provide an improved method for migrating servers in a network from a first version to a second version with minimal disruption to the network.

These and other objects of the invention are discussed or will be apparent from the following description of the invention.

SUMMARY OF THE INVENTION

The above-listed objects are met or exceeded by the present method for migrating servers in a hierarchical network from a first version of network software to a second version of network software incompatible with the first version. The hierarchical network includes plural slave servers connected to a master server, a given slave server communicating with another slave server through the master server. The method of the present invention includes a step of installing in the master server:

- a second version of network software which coexists with an existing first version of network software, the first version of network software processing data in a first format and the second version of network software processing data in a second format different from the first format;
- a first converter for converting the first format data to the second format data when a first predetermined event such as low CPU usage is detected; and
- a second converter for converting the second format data to the first format data when the same or a second predetermined event is detected;
- wherein the master server facilitates the communication and coexistence of slave servers running the first version of the network software with slave servers running the second version of the network software.

According to a further aspect of the present invention, selected ones of the slave servers may be sequentially upgraded from the first version of the network software to the second version of the network software with minimal interruption to the network as the master server maintains communications between slave servers running the first version of the network software with slave servers running the second version of the network software. Moreover, once all of the slave servers have been migrated to the second version of the network software, then the first version of network software, and the first and second converters may be deleted from the master server.

According to another aspect of the invention, each server is provided with a local directory containing user address information regarding local users directly attached to the server, and a master directory containing user address information regarding users indirectly available through other servers, the local directory and the master directory containing data stored in a first format. Moreover, each slave server is provided with a first version replicator program for communicating update information in the first format to and from a first version replicator program provided in the master server.

According to the present aspect of the invention, the master server is provided with a second version of network software which coexists with the first version of network software, the first version of network software processing data in the first format and the second version of network software processing data in a second format different from the first format. The master server is further provided with a second version replicator program which coexists with the first version replicator program and which communicates update information in the second format, and a pump mechanism. The pump mechanism includes an information converter for converting the first format data to the second format data when a first predetermined event is detected, and for converting the second format data to the first format data when the same or a second predetermined event is detected. Still further, the master server is provided with a converter for converting the first format data stored in the master server master directory to the second format and converting the first format data stored in the master server local directory to the second format.

In a network according to the above-described aspect of the invention, individual ones of the plurality of slave servers are migrated to the second version of the network software by overwriting the first version of network software with a second version of network software, overwriting the first version replicator program with the second version replicator program; overwriting the slave server copy of the master directory with a copy of the master server master directory, and installing a converter and converting the first format data stored in the slave server local directory to the second format.

BRIEF DESCRIPTION OF THE DRAWINGS

A preferred embodiment of the present invention is described herein with reference to the drawings, wherein:

FIGS. 4-1–4-5 show the condition of a network at various stages in the software upgrade process;

FIG. 5 is a flow chart of the process for adding a user to slave server 2;

DETAILED DESCRIPTION

Figure 1:
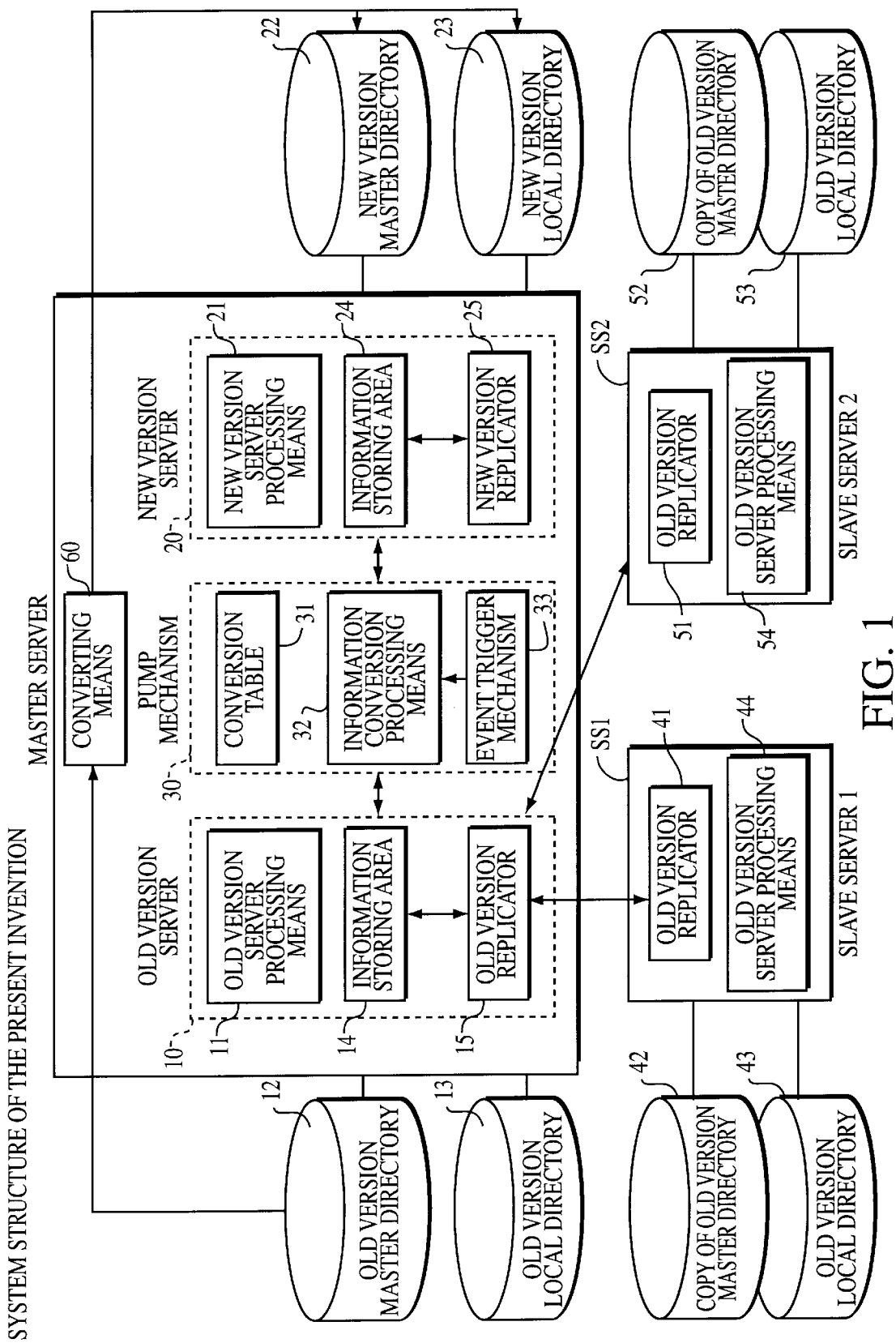
FIG. 1 illustrates a network according to the present invention.
Figure 3:
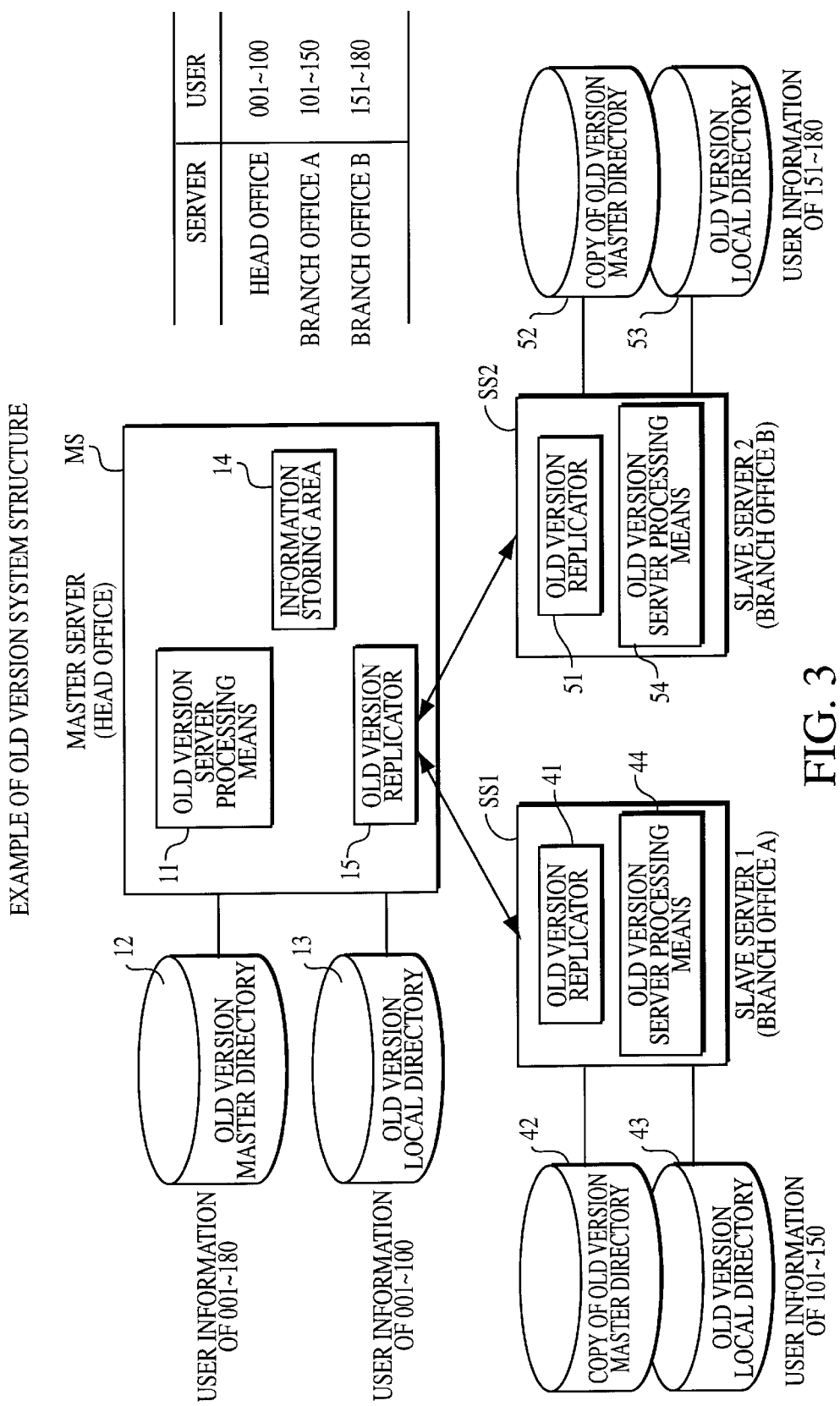
FIG. 3 illustrates a network prior to modification in accordance with the present invention.

FIG. 1 is a diagram illustrating the condition of an office server system according to the present invention showing the coexistence of servers operating under new software with servers running old software, whereas FIG. 3 illustrates the original condition of the office server system before the installation of the new software.

FIG. 3 will be explained first to provide a background for aspects of the invention. FIG. 3 depicts a network including a master server (MS) installed at a head office and a pair of slave servers installed at branch offices A, B, respectively. The slave servers SS1, SS2 are connected to the master server MS via individual lines. Each server (SS1, SS2, MS) is provided with various hardware components such as a CPU, memory and storage media (not illustrated in FIG. 3), as well as various software modules.

Each server is provided with a local directory 13, 43, 53 containing routing address information regarding local users attached directly to the server. Moreover, each server stores a copy of a master directory 12, 42, 52 containing routing address information regarding remote users accessible through other servers attached to the network.

A server program 11, 44, 54 provided in each server (SS1, SS2, MS) executes the various application processes and updates the data administrated locally within the server. Moreover, a replicator program 15, 41, 51 provided in each server causes the remote servers to execute processing necessary to update data administered remotely.

System operation will now be explained using the following example. Assume that a user 151 attached to slave server 2 originates an email to a user 001 attached to the master server MS. Upon receipt of the email request, the old version server processing means 54 of slave server 2 searches the old version local directory 53 for routing information. However, the search will not result in a hit as user 001 is not a local user of slave server 2. Consequently, the old version server processing means 54 refers to the old version master directory 52 which contains user information for the remote servers. The search of the old version master directory 52 returns a hit, and the email is routed to the address contained therein. Thus, according to the present example, the email will be sent to the master server MS.

In order to ensure that all the databases are up to date, changes to a local user information database on one server must be reflected in all of the other servers attached to the network. As noted above, the updating of remote databases is initiated by the so-called replicator program 15, 41, 51 provided in each server. For example, when information regarding user 151 is updated, the change is reflected in the old version local directory 53 on the slave server 2 (local server). Similar changes are required in the old version master directories 12 and 42 attached to the master server MS and slave server 1, respectively. These changes are initiated by the old version replicator 51, which passes the necessary data to replicator program 15 on the master server MS which, in turn, passes the data to replicator program 41. Moreover, replicator programs 15 and 41 instruct the server programs 11 and 44, respectively, to update the locally administered directories 12 and 42.

Aspects of the present invention will now be explained with reference to FIG. 1, in which like features are identified by like reference numbers. FIG. 1 depicts an intermediate phase of the upgrade process. Like the original network system, the system depicted in FIG. 1 includes a master server MS and two slave servers. However, additional software has been installed in the master server MS. Specifically, a new version server 20, a pump mechanism 30 and a converter 60 have been installed into the master server MS. It should be noted that the new version server 20, pump mechanism 30, and converter 60 may be embodied in software and or firmware, i.e., microcode stored in a ROM memory or the like. According to the preferred embodiment, however, the new version server 20, pump mechanism 30, and converter 60 are embodied in software which is loaded into the master server MS.

The new version server 20 communicates with the old version server 10 through the pump mechanism 30, which translates communications from one format to another. Moreover, the converter 60 is used for converting the old version format master directory 12 to a new format master directory 22, as well as for converting the old version format local directory 13 to a new format local directory 23.

The old version server 10 is composed of an old version server processing means 11 for executing the various processes of the server, an information storing area 14 for storing old version format data and an old version replicator 15 for transmitting and receiving the old version format data. Correspondingly, the new version server 20 is composed of a new version server processing means 21 for executing the process of server, an information storing area 24 for storing new version format data and a new version replicator 25 for transmitting and receiving the new version format data.

As noted above, the pump mechanism 30 interconnects the old server 10 with the new server 20. More specifically, the pump mechanism 30 is responsible for translating communications between the new format used by the new version server 20 and the old format used by the old version server 10. The pump mechanism 30 includes an event trigger mechanism 33 for initiating the translation process, a conversion table 31 for converting between the new version format data and the old version format data and vice versa, and an information conversion processing means 32 for converting between the data formats using the conversion table 31, and transmitting the converted data to the old version server 10 or new version server 20.

Figure 2:
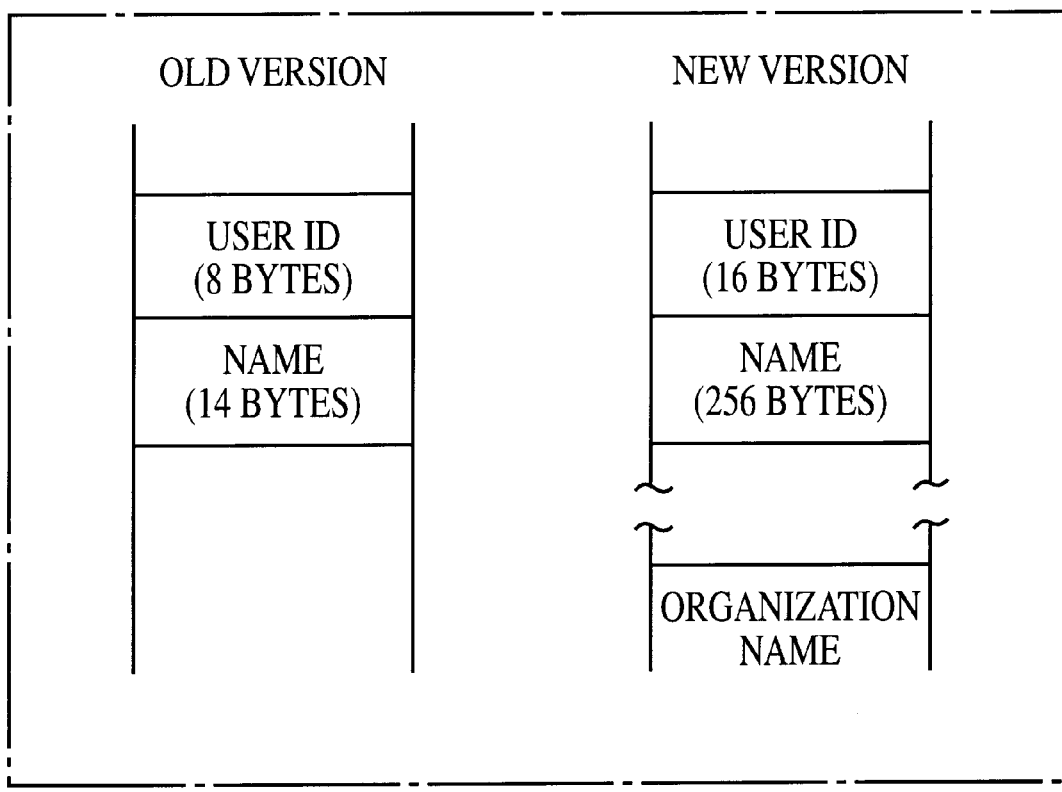
FIG. 2 is an example showing different formats used to store data in an old version of network software versus a new version of the network software.

In order to operate the new version server 20 on the master server MS, the new version master directory 22 and new version local directory 23 are generated from the old version master directory 12 and old version local directory, respectively, using the converter 60. FIG. 2 illustrates an example of the format differences between the old version local directory and the new version local directory. Thereafter, only the new version master directory 22 and new version local directory 23 are effective on the master server MS. In other words, use of the old version master directory 12 and the old version local directory 13 is discontinued. It should be noted that operation of the master server system is temporarily halted during the conversion process.

As noted above, FIG. 1 depicts an intermediate phase in the upgrade process wherein the slave servers are still operating under the old version format, whereas the master server MS has been provided with the capability of running under both the old and new version formats. Once the master server has been modified, the slave servers may be upgraded in a piecemeal manner without disrupting the network.

When the slave servers are upgraded to the new version format, the old version server processing means 44, 54 is replaced with the new version processing means, old version replicator 41, 51 is replaced with the new version replicator, and a converter 60 is installed. The converter 60 is used for converting the old version format local directory 43, 53 to the new version format. Moreover, the copy of the old version master directory 42, 52 is overwritten with a copy of the master server master directory 22. Alternatively, the converter 60 may be used to convert the old version master directory 42, 52 to the new version format.

When a given slave server is upgraded to the new version format, the master directories on the other servers must be updated to reflect the change. As explained above, the update process is initiated by the (local) replicator program of the server on which the change occurred. The local replicator program communicates the upgrade request to the replicator program 25 on the master server MS. In turn, the master server MS communicates the update request to the other slave servers.

The master server MS and plurality of slave servers under the control of the master server MS is collectively termed an area. With the exception of the master server MS, the upgrade sequence in a given area may be randomly determined. In other words, once the master server has been upgraded, the order in which the slave servers are upgraded will not affect the functioning of the network.

Figures 1, 4:
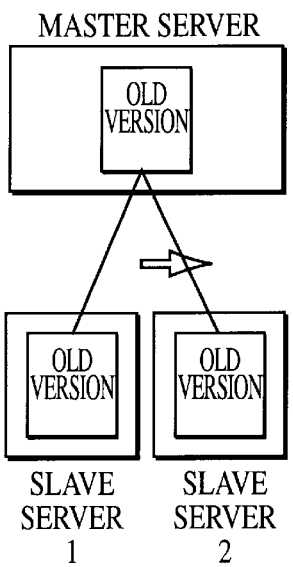
Figures 2, 4:
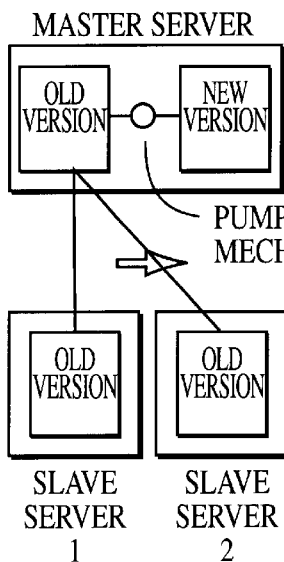
Figures 3, 4:
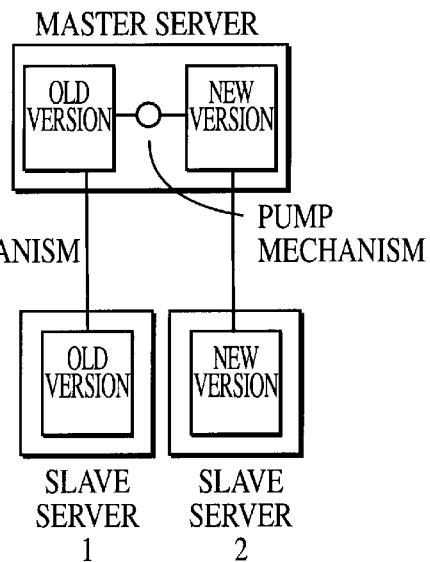
Figure 4:
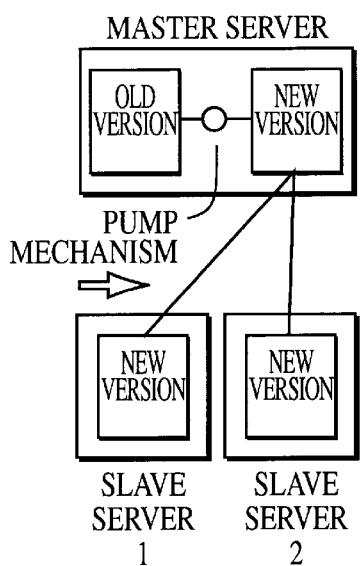
Figures 4, 5:
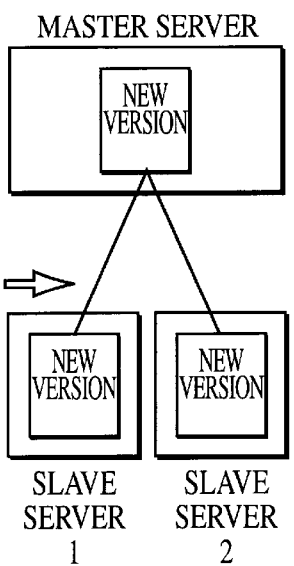
Figure 5:
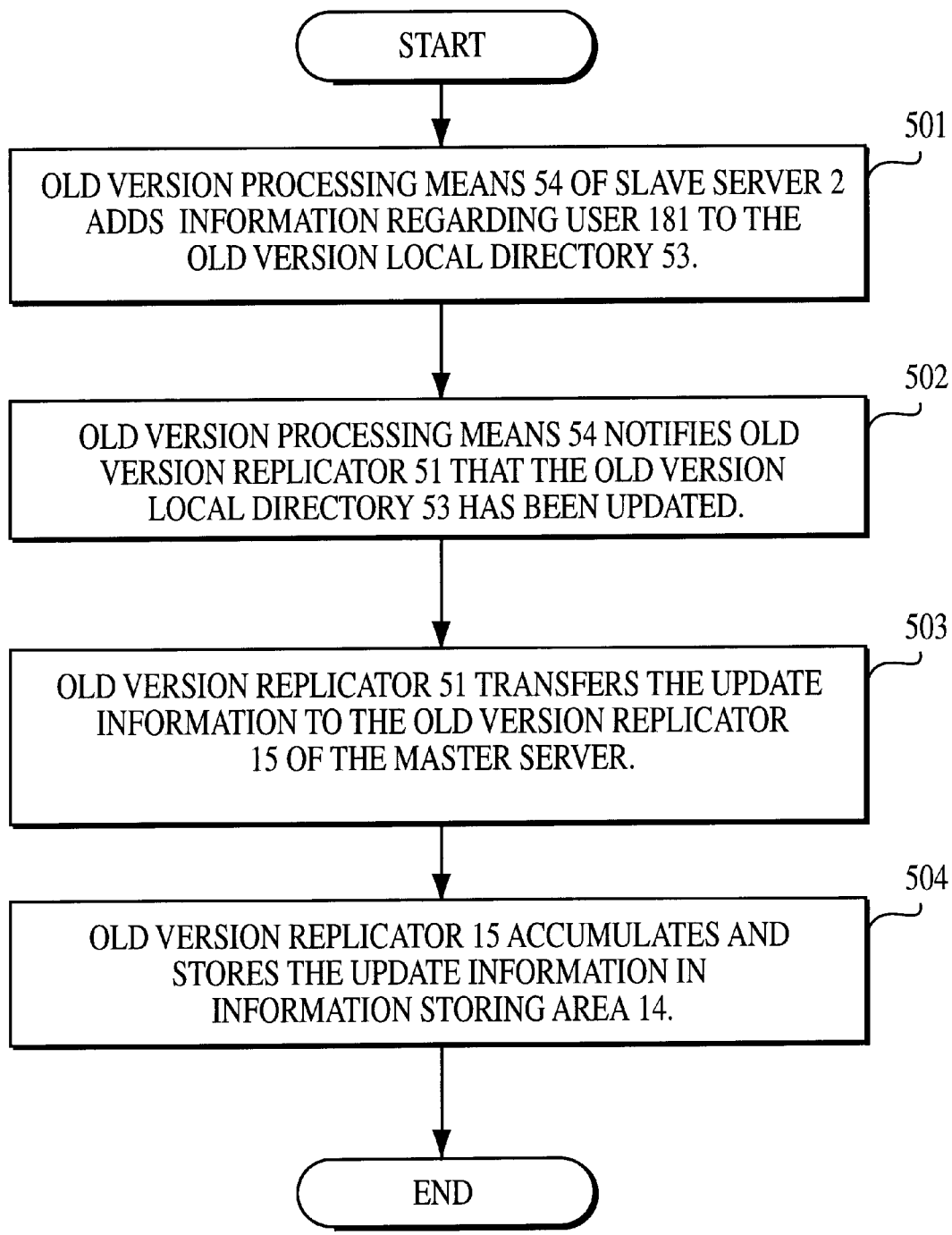

FIGS. 4-1 through 4-5 illustrate the various phases of the server upgrade process for a given area.

FIG. 4-1 illustrates a preliminary condition in which the whole area is operating under the old version format, and is similar to the condition shown in FIG. 3.

FIG. 4-2 illustrates a first intermediate phase in the upgrade process wherein the master server is provided with the capability of operating concurrently under both the old and new version formats, and is similar to the condition of FIG. 1. As shown in FIG. 4-2 and FIG. 1, the new version server 20, which coexists with the old version server 10, has been installed in the master server MS. As described above, the new version server includes a new version server processing means 21 for performing the various processes of server, an information storing area 24 for storing new version format data and a new version replicator 25 for transmitting and receiving the new version format data. Further, as shown in FIG. 4-2, both of the slave servers still communicate with the master server in the first format. In other words, neither slave server has been upgraded from the old version, and thus each slave server is shown communicating with the old version server side of the master server.

FIG. 4-3 illustrates a second intermediate phase in the upgrade process wherein slave server 2 has been upgraded to the new version format using the process described above, and is connected to the new version server side of the master server. It should be noted that slave server 1, which has not been upgraded, remains connected to the old version server side of the master server. In other words, slave server 2 communicates with the master server in the new version format, whereas slave server 1 still communicates in the old version format.

FIG. 4-4 illustrates a third intermediate phase in the upgrade process wherein both slave server 1 and slave server 2 have been upgraded to the new version and are connected to the new version server side of the master server.

FIG. 4-5 illustrates a fourth and final phase in the upgrade process wherein all the servers in the area are shifted to the new version, and the old version server within the master server and pump mechanism are deleted.

In the system depicted in FIGS. 4-1 through 4-5, the office server system consisted of a single area, i.e., one master server and plural slave servers. One of ordinary skill in the art will appreciate that in operation a plurality of areas may be connected in parallel, in a hierarchical structure, or in a combination thereof. Moreover, all of the above teachings with regard to one area are applicable in each of these network topologies.

FIG. 5 is a flow chart showing steps in the process for adding a new user 181 to the slave server 2 in the system shown in FIG. 1. When a user 181 is added to the slave server 2, the old version server processing means 44 adds the routing address information regarding user 181 to the old version local directory 53 (S501), and triggers the functions of the old version replicator 51 (S502).

The old version replicator 51 transfers update information regarding user 181 from slave server 2 to the old version replicator 15 of the master server (S503). In turn, the old version replicator 15 of the master server MS accumulates and stores the update information to the information storing area 14 (S504).

Although not illustrated in FIG. 5, the old version replicator 15 also passes the update information to the old version replicator of servers still operating under the old version format, i.e, the old version replicator 41 of slave server 1. Upon receiving the update information, the old version replicator 41 instructs the old version server processing means 44 to update the old version master directory 42. Processing of the update information stored in the information storing area 14 will be explained with reference to FIG. 6.

Figure 6:
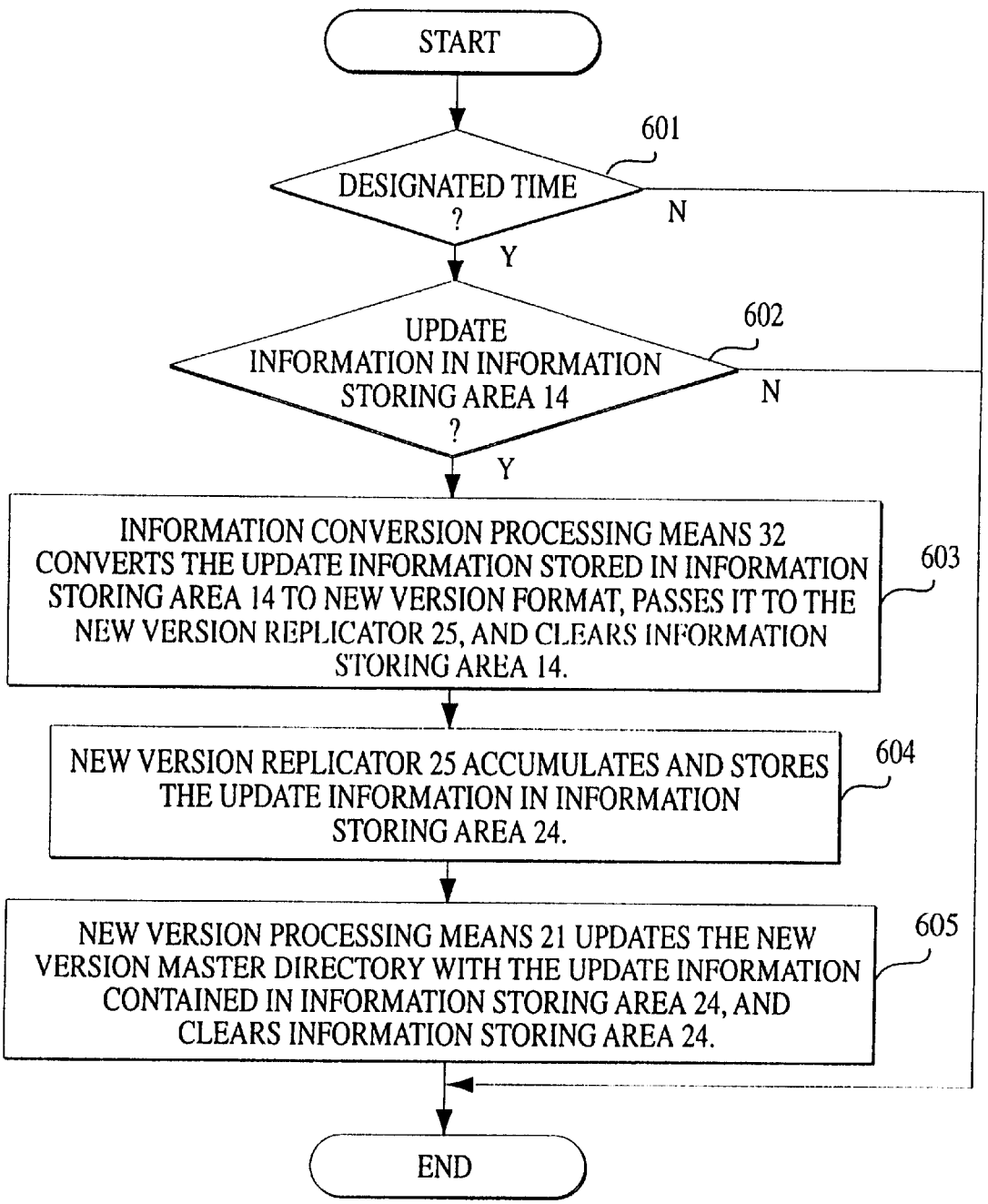
FIG. 6 is a flow chart of the process for updating the master directory on the master server to reflect changes to the slave server.

FIG. 6 illustrates the process for updating the new version master directory 22 of the master server MS to include the updated information stored in the information storing area 14.

As noted above, old version update information is received by the old version replicator program 15 of the master server, and is stored in the information storing area 14. It should be appreciated that the old version update information must be converted into the new format before it can be used to update the new version master directory 22. However, to reduce the processing burden on the CPU, the new version master directory 22 is not updated each time update information is stored in the information storing areas 14, 24. Rather, the pump mechanism 30 monitors a number of conditions such as the amount of update information stored in the information storing areas 14, 24, the elapsed time since the receipt of the update information, and the processing load of the CPU.

When a predetermined condition is detected, i.e., low CPU processing load (S601), the event trigger mechanism 33 is initiated to start the information conversion processing means 32. Once the information conversion processing means 32 is triggered, the information conversion processing means 32 searches the information storing area 14 for the presence of update information (S602), and converts the update information from the old version format to the new version format using the conversion table 31. The converted information is then passed to the new version replicator 25, and the information storing area 14 is then cleared (S603). The new version replicator 25 stores the converted data in the information storing area 24, and requests the new version server processing means 21 to update the new version master directory 22 (S604).

The new version server processing means 21 inserts the converted update information (stored in the information storing area 24) into the new version master directory 22, and clears the contents of the information storing area 24 (S605). Moreover, although not specifically shown in FIG. 6, the new version replicator 25 also passes the converted update information to the new version replicator of any slave server operating under the new format.

Figure 7:
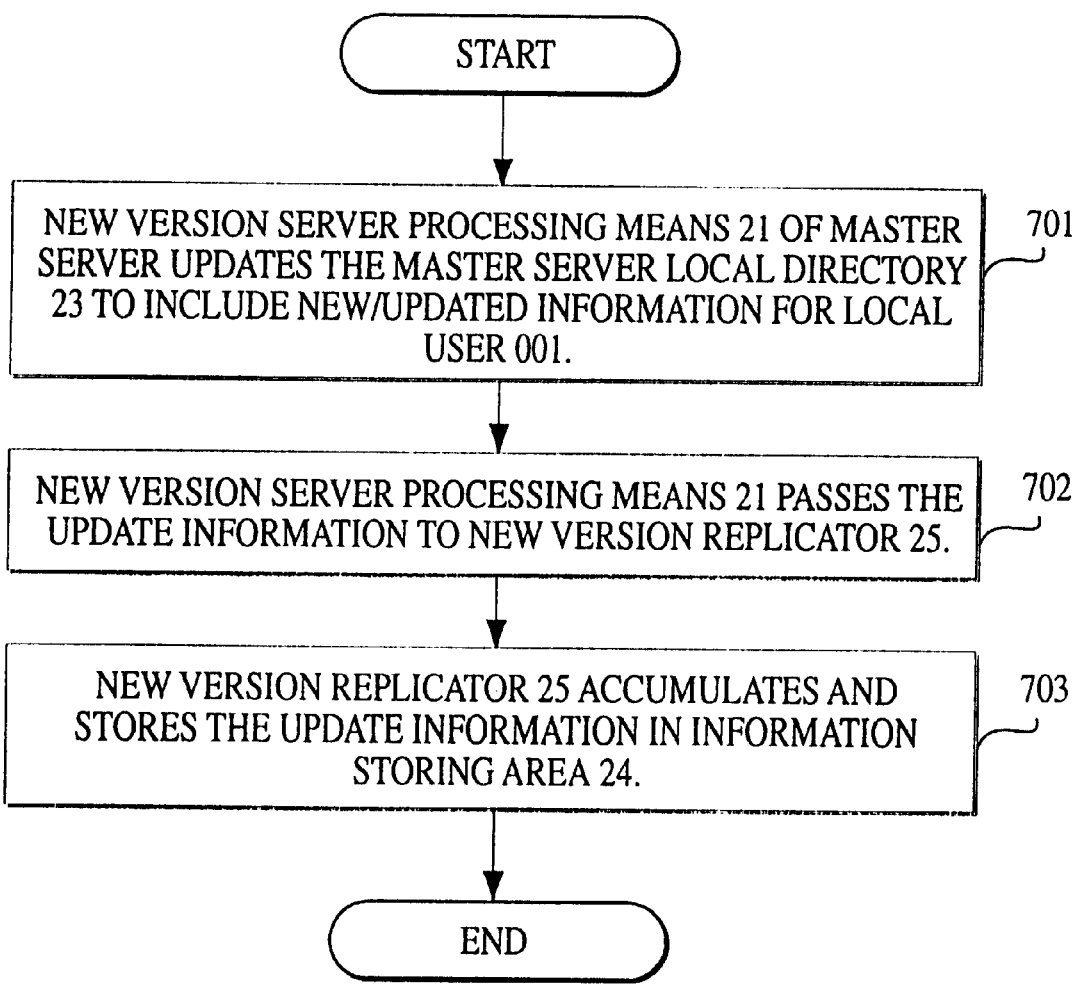
FIG. 7 is a flow chart of the process for updating the local directory on the master server.

FIG. 7 is a flowchart which illustrates the steps for updating information regarding a local user 001 of the master server MS in the system shown in FIG. 1. When information regarding a local user of the master server MS is updated, the new version server processing means 21 updates the new version local directory 23 (S701). Moreover, the new version server processing means 21 notifies the new version replicator 25 of the update information (S702). In turn, the new version replicator 25 stores the update information in the information storing area 24 (S703).

The process for converting the new version format update information to the old version format and updating slave servers operating under the old version format will be explained below with reference to FIG. 8.

Figure 8:
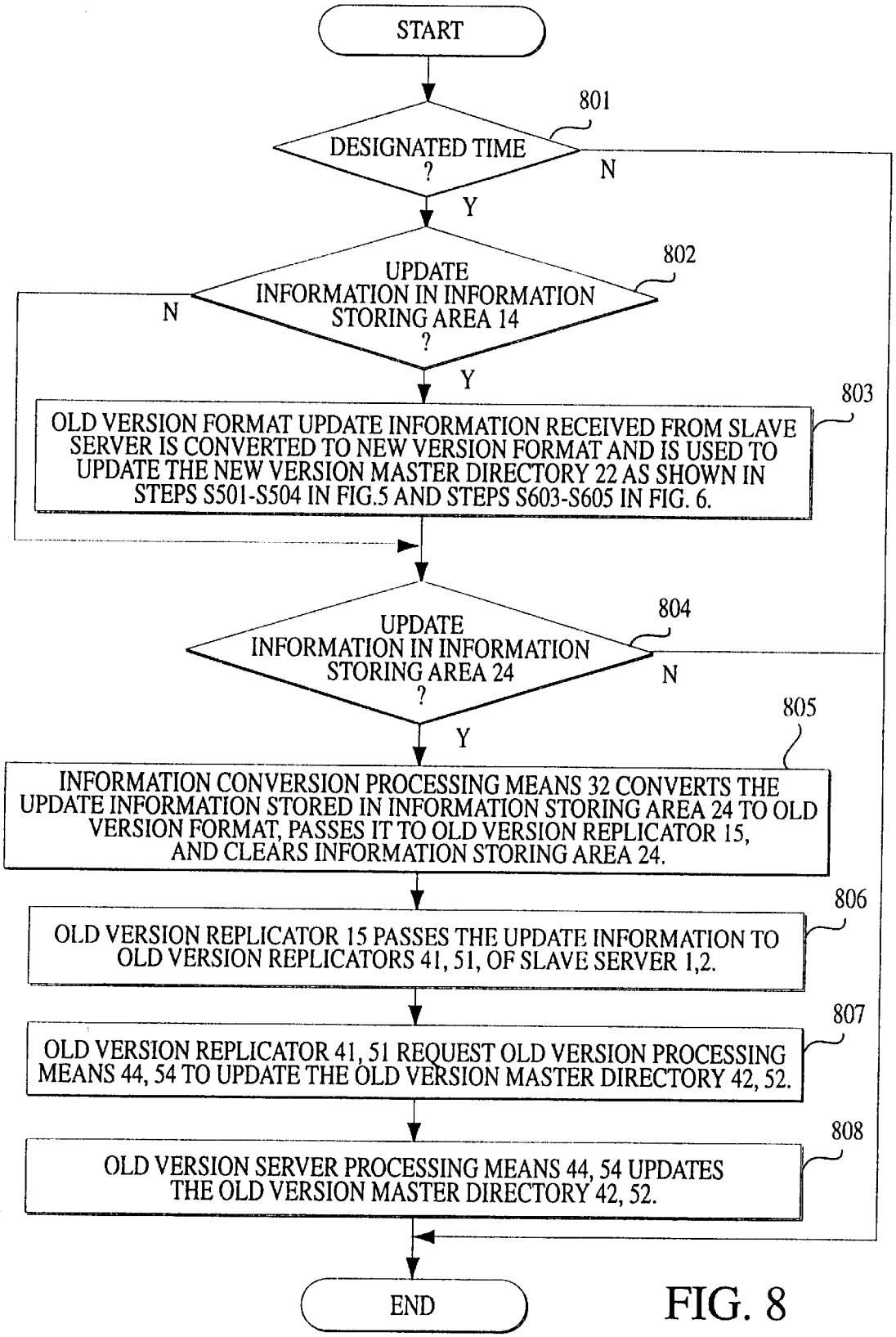
FIG. 8 is a flow chart of the process for distributing update information from the master server MS to the slave servers.

FIG. 8 is a flow chart showing steps in the process for distributing update information between the master server MS and the slave servers. Steps S801 through S803 depict in summary form steps S501–S504 in FIG. 5 and steps S601 through S605 of FIG. 6.

As noted above, the pump mechanism 30 monitors a number of conditions such as the presence and amount of update information stored in the information storing areas 14 and 24, the elapsed time since the receipt of the update information, and the processing load of the CPU. When a predetermined condition is detected, e.g., low CPU processing load, the event trigger mechanism 33 is initiated (S801) to start the information conversion processing means 32.

As described with reference to FIG. 7, the information conversion processing means 32 checks whether there is data in the information storing area 14, i.e., old version format data awaiting conversion to the new format (S802). If the old version format update information is detected, it is converted to the new version format and is used to update the new version master directory 22 of the master server as well as the new version master directory of any server which has been converted to the new version format (S803). See, e.g., FIG. 6 and FIG. 7.

Additionally, the information conversion processing means 32 checks whether there is data in the information storing area 24, i.e., new version data awaiting conversion to the old format (S804). If new version data is detected, the information conversion processing means 32 converts the data using the conversion table 31, passes the converted data to the old version replicator 15, and clears the information storing area 24 (S805).

The old version replicator 15 transfers the converted update information to the old version replicators 41, 51 of slave servers which are still operating under the old version format (S806). In turn, the old version replicator 41, 51 of the slave servers instruct the old version server processing means 44, 54 to update the master directory (S807 and S808).

In the above-described embodiment, the local directory is updated in real time each time user information regarding local users is modified. However, the master directories of the other servers are not necessarily updated immediately. Rather, as described above, the updating of the master directories may be delayed until the master server converts the format of the update information. In general, it is convenient to postpone updating the master directories to reduce the CPU load of the servers. However, if desired, it is also possible to synchronously update the local directory and master directory by adjusting the definition of the predetermined condition.

During the process of upgrading a given slave server, the local users of the subject slave server are affected, but the other users of the network are not. Moreover, when the subject slave server is upgraded, the old version replicator is deleted and the new version replicator of the slave server is connected to the new version replicator 25 on the master server side.

The master server maintains a format table indicating the format used to communicate with each slave server. Consequently, the format table must be updated to reflect the fact that the slave server has been upgraded to the new version format in order to enable communications between the newly upgraded slave server and the master server.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Method for migrating servers in a hierarchical network from a first version of network software to a second version of network software which communicates in a different data format than the first version, the hierarchical network including plural slave servers connected to a master server, a given slave server communicating with another slave server through the master server, said method comprising:

installing in the master server:

a second version of network software which coexists with an existing first version of network software, said first version of network software processing data in a first format and said second version of network software processing data in a second format different from said first format;

a first converting means for converting said first format data to said second format data when a first predetermined event is detected; and a second converting means for converting said second format data to said first format data when a second predetermined event is detected;

sequentially upgrading selected ones of the plural slave servers from the said first version of the network software to said second version of the network software;

wherein the master server facilitates the communication and coexistence of slave servers running said first version of the network software with slave servers running said second version of the network software.

2. Method for migrating servers according to claim 1, further comprising the steps of:

deleting said first version of network software, and said first and second converting means from the master server once each of said plural slave servers has been upgraded to the second version of network software.

3. Method for migrating servers in a hierarchical network from a first version of network software to a second version of network software having a different data format than the first version, the hierarchical network including plural slave servers connected to a master server, a given slave server communicating with another slave server through the master server, each slave server and master server storing a local directory containing user address information regarding local users directly attached to the server and a master directory containing user address information regarding users indirectly available through other servers, the local directory and the master directory containing data stored in a first format, each slave server being provided with a first version replicator program for communicating update information in the first format to and from a first version replicator program provided in the master server, said migration method comprising:

installing in the master server:
a second version of network software which coexists with an existing first version of network software, said first version of network software processing data in a first format and said second version of network software processing data in a second format different from said first format;

a second version replicator program which coexists with the first version replicator program, said second version replicator program communicating update information in said second format;

a pump mechanism including an information converting means for converting said first format data to said second format data when a first predetermined event is detected, and for converting said second format data to said first format data when a second predetermined event is detected; and a converting means for converting the first format data stored in the master server master directory to the second format and converting the first format data stored in the master server local directory to the second format; and migrating individual ones of the plurality of slave servers to the second version of the network software;

wherein the master server facilitates the communication and coexistence of slave servers running said first version of the network software with slave servers running said second version of the network software.

4. Method for migrating servers according to claim 3, wherein said step of migrating individual ones of the plurality of slave servers to the second version of the network software includes the steps of:

overwriting the first version of network software with a second version of network software;

overwriting the first version replicator program with said second version replicator program;

overwriting the slave server copy of the master directory with a copy of the master server master directory; and converting the first format data stored in the slave server local directory to the second format.

5. Method for migrating servers according to claim 3, wherein:

said pump mechanism converts first format data received by said master server first version replicator program into second format data and transfers the converted data to second version slave servers using the second version replicator program; and said pump mechanism also converts second format data received by said master server second version replicator program into first format data and transfers the converted data to first version slave servers using the first version replicator program.

6. Method for migrating servers according to claim 4, further comprising the steps of:

deleting the first version of network software once all of the slave servers have been migrated to said second version of network software;

deleting the first version replicator program once all of the slave servers have been migrated to said second version of network software; and deleting the pump mechanism once all of the slave servers have been migrated to said second version of network software.

7. Method for updating servers connected in a hierarchical network, the servers being upgraded from a first communications program processing data in a first format to a second communications program processing data in a second format, where the first format data is different form said second format data, comprising:

installing in a master server a second communications program which coexists with a first communications program and operating the second communications program simultaneously with the first communications program, whereby slave servers communicating using the first communications program and slave servers communicating using the second communications program con both communicate with the master server;

installing in a master server a third program including a first converting means for converting the first format data to the second format data when the preset first event is generated and a second converting means for converting the second format data to the first format data; and suspending execution of the first communications program and the third program after each slave server connected to the master server has been upgraded to the second communications program.

* * * * *